United States Patent
Ozaki et al.

(10) Patent No.: US 7,474,808 B2
(45) Date of Patent: Jan. 6, 2009

(54) IMAGE PROCESSING DEVICE AND IMAGE PROCESSING METHOD

(75) Inventors: Hiroshi Ozaki, Tokyo (JP); Katsuo Ogura, Tokyo (JP); Kazuhiro Mino, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 702 days.

(21) Appl. No.: 10/959,047

(22) Filed: Oct. 7, 2004

(65) Prior Publication Data

US 2005/0078885 A1   Apr. 14, 2005

(30) Foreign Application Priority Data

Oct. 8, 2003 (JP) ............... 2003-349509

(51) Int. Cl.
*G06K 9/54* (2006.01)
*G06F 17/30* (2006.01)

(52) U.S. Cl. ............... 382/305; 382/217; 707/3

(58) Field of Classification Search ............ 382/209, 382/217–220, 305, 103, 190; 707/1–10

See application file for complete search history.

(56) References Cited

U.S. PATENT DOCUMENTS

| | | | | |
|---|---|---|---|---|
| 6,285,995 | B1* | 9/2001 | Abdel-Mottaleb et al. | 707/3 |
| 6,340,935 | B1* | 1/2002 | Hall | 340/932.2 |
| 6,456,747 | B2* | 9/2002 | Altman | 382/305 |
| 6,504,571 | B1* | 1/2003 | Narayanaswami et al. | 348/231.99 |
| 6,546,309 | B1* | 4/2003 | Gazzuolo | 700/132 |
| 6,961,463 | B1* | 11/2005 | Loui et al. | 382/170 |
| 2002/0067856 | A1* | 6/2002 | Fujii et al. | 382/218 |
| 2003/0033296 | A1* | 2/2003 | Rothmuller et al. | 707/3 |
| 2003/0084065 | A1* | 5/2003 | Lin et al. | 707/104.1 |
| 2004/0122810 | A1* | 6/2004 | Mayer | 707/3 |

FOREIGN PATENT DOCUMENTS

| | | | |
|---|---|---|---|
| JP | 10-233985 | A | 9/1998 |
| JP | 2001-229382 | A | 8/2001 |
| JP | 2002-117409 | A | 4/2002 |
| JP | 2004-62605 | A | 2/2004 |
| JP | 2004-86538 | A | 3/2004 |
| JP | 2004-86539 | A | 3/2004 |
| JP | 2004-86737 | A | 3/2004 |

* cited by examiner

*Primary Examiner*—Daniel G Mariam
(74) *Attorney, Agent, or Firm*—Sughrue Mion, PLLC

(57) ABSTRACT

A partial image identifying section extracts objects from an inputted image inputted by an image inputting section, and identifies types of the objects. A characteristic information generating section generates characteristic information of each object on the basis of a characteristic amount computed for each object. A plurality of partial image databases are provided for the respective types of objects. For each object, a degree of similarity computing section computes, on the basis of both characteristic information, degrees of similarity with all objects registered in the partial image database which corresponds to the type of the object. A photographing time period specifying section specifies a photographing time period, from the respective degrees of similarity computed by the degree of similarity computing section. A registering section registers extracted objects in association with the specified photographing time period, in the databases of the types corresponding to the objects.

22 Claims, 4 Drawing Sheets

IMAGE PROCESSING DEVICE AND IMAGE PROCESSING METHOD

CROSS-REFERENCE TO RELATED APPLICATION

This application claims priority under 35 USC 119 from Japanese Patent Application No. 2003-349509, the disclosure of which is incorporated by reference herein.

BACKGROUND OF THE INVENTION

1. Field of the Invention

The present invention relates to an image processing device, and in particular, to an image processing device which divides a photographed image, which has been photographed by a photographing means, into partial images, and estimates the date of the photographed image on the basis of the respective partial images.

2. Description of the Related Art

A conventional technique has been proposed which searches for the degree of similarity of an object included in an image, and provides information relating to the object. For example, Japanese Patent Application Laid-Open (JP-A) No. 2001-229382 discloses a technique in which characteristic amounts of a plurality of images obtained by photographing an object in advance under plural conditions are extracted. For each characteristic amount relating to the same object, information relating to the object and the object associated therewith are generated and stored in a database. By using this database, the degree of similarity of an object included in an inputted image is retrieved, and information relating to that object is provided.

Further, JP-A No. 2002-117409 proposes a technique in which, when an object is extracted by dividing an image into regions by using clustering and the degree of similarity of the object is searched for, a background mask of the image is generated. On the basis of this background mask, background regions are detected and eliminated, such that the object is extracted.

In a database of images used at the time of such searching for the degree of similarity of an object of an image, conventionally, the user himself/herself must set the types or names of the objects in advance, and must register objects of the set types or names in the database. The labor involved in the database registration work and the like is bothersome.

Moreover, JP-A No. 10-233985 discloses a technique in which images, which are photographed by a digital camera to which a GPS (Global Positioning System) device is connected, are efficiently categorized on the basis of the GPS information obtained by the GPS device, such as position information, time information, and the like.

In the technique disclosed in JP-A No. 10-233985, albums corresponding to the places where the photographing took place can be prepared. However, for images which were photographed in the past, such as photographs or the like collected in old albums or the like, the photographing time period of an image at which the photographing month/date/year is not recorded cannot be known, and it is not possible to address the demands of users who wish to classify such photographs in accordance with their photographing time periods.

SUMMARY OF THE INVENTION

The present invention was developed in consideration of the aforementioned, and an object of the present invention is to provide an image processing device which can efficiently specify the photographing time period of an image which does not have photographing month/date/year information.

In order to achieve the above-described object, a first aspect of the present invention is an image processing device having: a partial image extracting section extracting a partial image from an inputted image; a type distinguishing section distinguishing a type of the partial image; a plurality of partial image databases provided respectively for each of the types, and storing registered partial images and photographing time periods of the registered partial images in association with one another; a characteristic information generating section generating characteristic information of the partial image and characteristic information of the registered partial images; a degree of similarity computing section computing, on the basis of both characteristic information, degrees of similarity between the partial image and the registered partial images which are stored in the partial image database which corresponds to the type of the partial image; a photographing time period specifying section specifying a photographing time period of the inputted image, on the basis of results of computation by the degree of similarity computing section; and an outputting section outputting the photographing time period which is specified.

In accordance with the present invention, a partial image is extracted from an inputted image by the partial image extracting section. The type of the extracted partial image is distinguished by the type distinguishing section.

A plurality of partial image databases are provided, for respective types of partial images. Registered partial images, and photographing time periods of the registered partial images, are stored in association with one another in the partial image databases.

The characteristic information generating section generates characteristic information of the partial image, and characteristic information of the registered partial images which are registered in the partial image databases.

On the basis of the both characteristic information, i.e., on the basis of the characteristic information of the partial image extracted by the partial image extracting section and the characteristic information of the registered partial images which are registered in the partial image databases, the degree of similarity computing section computes the degrees of similarity between the partial image extracted by the partial image extracting section, and the registered partial images which are stored in the partial image database which corresponds to the type of the partial image which type was distinguished by the type distinguishing section.

The photographing time period specifying section specifies the photographing time period of the inputted image, on the basis of the results of computation by the degree of similarity computing section. For example, as in a second aspect of the present invention, the photographing time period specifying section may specify, as the photographing time period of the inputted image, a photographing time period of a registered partial image whose degree of similarity is greater than or equal to a predetermined threshold value and whose degree of similarity is highest, among the degrees of similarity computed by the degree of similarity computing section. The specified photographing time period is outputted by the outputting section.

In this way, a partial image is extracted from an inputted image, and first, the type of the extracted partial image is specified, and then a registered partial image which has a high degree of similarity is retrieved from the registered partial images which are registered in the partial image database of that type, and the photographing time period is specified. Therefore, a registered partial image which is similar to the inputted image can be retrieved efficiently, and the photographing time period of an inputted image, whose photographing time period is unclear, can be specified accurately.

In a third aspect of the present invention, the image processing device may be structured so as to further include a registering section which registers, in the corresponding partial image database, the partial image together with information regarding the photographing time period specified by the photographing time period specifying section. In this way, each time an image is inputted, partial images are accumulated in the partial image databases, and the accuracy of retrieving a similar image and specifying the photographing time period can be improved.

As described above, the present invention has the excellent effect that it is possible to efficiently specify the photographing time period of an image which does not have information relating to the photographing month/date/year thereof.

DETAILED DESCRIPTION OF THE INVENTION

An example of an embodiment of the present invention will be described in detail with reference to the drawings.

Figure 1:
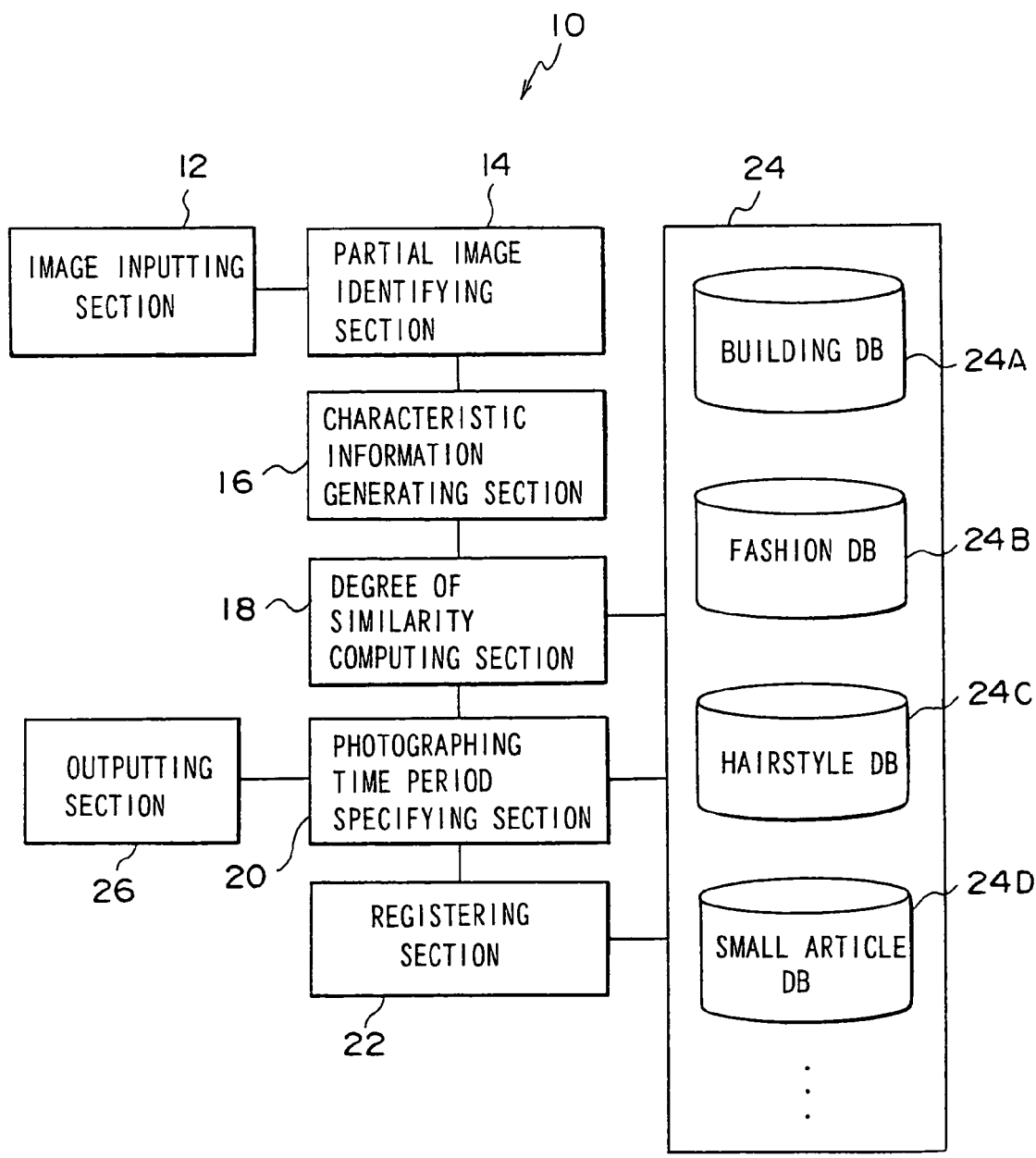
FIG. 1 is a block diagram of an image processing device.

A schematic block diagram of an image processing device 10 relating to the present invention is shown in FIG. 1. As shown in FIG. 1, the image processing device 10 is structured so as to include an image inputting section 12, a partial image identifying section 14, a characteristic information generating section 16, a degree of similarity computing section 18, a photographing time period specifying section 20, a registering section 22, a partial image database 24, and an outputting section 26.

The image inputting section 12 is for inputting an image whose photographing time period is unclear. For example, a scanner can be used which illuminates light onto a reflection original such as a print photograph or the like, and obtains the image of the original by reading the reflected light.

It suffices for the image inputting section 12 to be a structure which enables input of an image. The image inputting section 12 is not limited to a scanner, and may be, for example, a film scanner reading a transparent original such as a photographic film or the like, a card reader for reading a digital image recorded on a recording medium such as a memory card or the like, a drive device for reading a digital image recorded on a CD, a DVD, or the like, a communication interface device which receives digital images transferred via a network, or the like.

The partial image identifying section 14 divides an image, which has been inputted by the image inputting section 12, into regions for each of the objects, extracts object regions, and identifies the types of the extracted objects.

A conventionally known method can be used for identifying the type of object at the partial image identifying section 14. For example, the technique disclosed in JP-A No. 2004-062605, which is an application of the present applicant, can be used. In this way, the types of the objects can be identified correctly.

Figure 2:
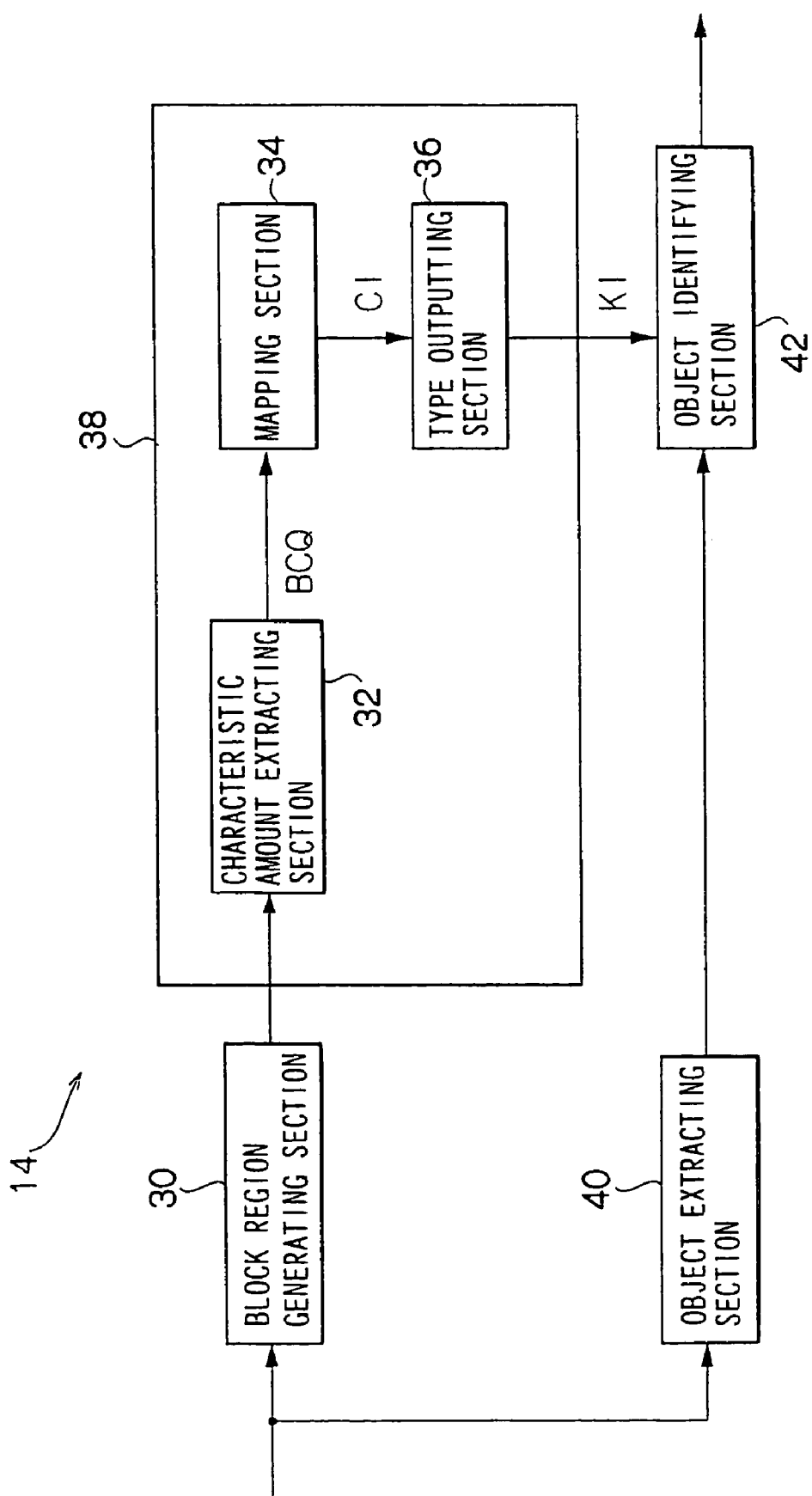
FIG. 2 is a block diagram of an object identifying section.

Namely, as shown in FIG. 2, the partial image identifying section 14 can be structured so as to include a block region generating section 30; a block region identifying section 38 formed from a characteristic amount extracting section 32, a mapping section 34, and a type outputting section 36; an object extracting section 40; and an object identifying section 42.

An overview of the partial image identifying section 14 will be described hereinafter.

The block region generating section 30 generates a plurality of block regions obtained by dividing an inputted image per number of pixels which has been set in advance.

The characteristic amount extracting section 32 extracts, from the block regions which are obtained by the dividing by the block region generating section 30, a plurality of block characteristic amounts BCR which are formed from a color component, a lightness component, and an image-wise characteristic component.

The mapping section 34 has, for example, a two-dimensional space formed from a self-organizing map, and maps plural block characteristic amounts on the two-dimensional space.

The type outputting section 36 has a type frequency distribution map which defines type information for each position on the two-dimensional space. The type outputting section 36 outputs type information KI of a block region, by using the type frequency distribution map, from coordinate information CI on the two-dimensional space which has been mapped by the mapping section 34. In this way, the type of each block region can be identified.

The object extracting section 40 divides the inputted image into regions for the respective objects so as to generate object regions, and outputs the object regions to the object identifying section 42. The object extracting section 40 is structured so as to include a characteristic amount classifying section, a region dividing section, a database, a minimum cluster region extracting section, an integration region judging section, a region integrating section, and the like, none of which are illustrated.

The characteristic amount classifying section extracts a plurality of pixel characteristic amounts from respective pixels structuring the inputted image, and classifies the pixels per each similar pixel characteristic amount. For example, the technique disclosed in JP-A No. 2004-086538, which is an application of the present applicant, can be used for the characteristic amount classifying section. In this way, classification of the characteristic amounts can be carried out precisely.

The region dividing section generates a plurality of clustering regions by dividing, into regions, each classification of pixels which has been classified by the characteristic amount classifying section.

The minimum cluster region extracting section extracts, from among the clustering regions in the database, the minimum clustering region having the fewest pixels.

The integration region judging section extracts, from the database, adjacent clustering regions which are adjacent to the minimum clustering region.

On the basis of the minimum clustering region extracted by the minimum cluster region extracting section, and the adjacent clustering regions extracted by the integration region judging section, the region integrating section integrates the clustering regions which were divided by the region dividing section, and extracts object regions.

By using the type information KI of each block region forwarded from the type section, the object identifying section 42 identifies the types of the object regions extracted by the object extracting section 40. Specifically, the object identifying section 42 tabulates the type information KI of the block regions within the object region, and identifies the type information, which arises the most, as the type of that object.

The technique disclosed in, for example, JP-A No. 2004-086539, which is an application of the present applicant, may be used for the division into regions. In this way, an inputted image can be accurately divided into texture regions and regions other than texture regions.

The characteristic information generating section 16 computes a characteristic amount for each identified object, and, on the basis of the characteristic amount, generates characteristic information of each object. Further, in the same way, the characteristic information generating section 16 also generates characteristic information of the objects registered in the partial image database 24.

For each of the objects, the degree of similarity computing section 18 computes, on the basis of the both characteristic information, the degrees of similarity between the object and the objects which are registered in the partial image database 24.

The partial image database 24 is structured from a plurality of partial image databases for each type of object. In the present embodiment, as an example, the partial image database 24 is structured so as to include a building database 24A, a fashion database 24B, a hairstyle database 24C, a small article database 24D, and the like. Partial image data of objects which have been photographed in advance at various time periods are stored in each database, together with and in association with added information such as photographing time period information or the like. Here, in the case of 1989 for example, the photographing time period is not limited to cases in only that year, and includes cases spanning a period of several years, such as 1989 through 1991. Further, the time period is not limited to the year, and may include the month and date as well.

Partial image data of, for example, buildings such as office buildings, houses, and the like, as well as various types of monuments, landmarks, and the like, are stored in the building database 24A.

A partial image database of clothes which were common in or which were in vogue in each era is stored in the fashion database 24B.

A partial image database of hairstyles which were common in or which were in vogue in each era are stored in the hairstyle database 24C. Note that, not only hairstyles, but a partial image database of a style of make-up which was common in or which was in vogue in each era may be stored.

Partial image data of mailboxes and public telephones of each era, and pop-culture goods or brand-name goods which were popular at those times, are stored in the small article database 24D.

Further, the above-described types of partial image databases and contents of partial image databases are examples, and in addition thereto, various partial image databases can be provided in accordance with the types or the like of inputted images for which specifying of the photographing time periods is desired. For example, if the inputted images are images photographed in vicinities of various train stations, the building database 24A may include partial images of station buildings, landmarks therearound, and the like. In this case, images of respective stations of respective eras can be accumulated. Further, a partial image database for storing landscape images such as trees, roads, and the like, may be provided.

When the inputted images are family photographs, a partial image database exclusively for that family may be provided. In this case, partial images of each person in each era are registered in the partial image database. Moreover, information relating to the respective persons in the family (birth-dates, years in which they were alive, topics, and the like) may be included as added information. In this way, it is possible to specify the photographing time periods of photographs which have been collected in old albums and whose photographing time periods are unclear, and the database can be utilized as a family history.

Information other than photographing time period information may be included in the added information. For example, the building database 24A may include information relating to the date of construction of a building, information relating to the date of rebuilding, or the like, and this information may be used in the judgment of specifying the photographing time period.

For the generation of the characteristic information by the characteristic information generating section 16 and the computation of the degrees of similarity by the degree of similarity computing section 18, the techniques disclosed in JP-A No. 2004-086737, which is an application of the present applicant, can be used.

Namely, for example, names of objects, reliabilities of the names of the objects, position information of the objects, size information of the object, and pixel characteristic amounts of the objects, are used in the characteristic information.

The characteristic information generating section 16 first divides an object region into small regions, and computes a characteristic amount for each small region. Here, the average color of the small region, or the frequency components of respective directions, is used as the characteristic information.

Then, on the basis of a characteristic amount vector obtained from the characteristic amount of each small region, what object name that small region belongs to, and the reliability thereof, are judged. This judgment is carried out on the basis of output from the self-organizing map by inputting characteristic amount vectors to the self-organizing map which has carried out learning with respect to the plural object names. In the present embodiment, the object names are classified in correspondence with the partial image databases, and are classified into building-related object names, fashion-related object names, hairstyle-related object names, and small article-related object names.

When object names have been determined for all of the small regions, the object name of the small regions which exist the most in that object region and the reliability thereof are set as the object name and the reliability of that object region.

The center of gravity coordinate of the object region or the rectangular region circumscribing the object, is used as the position information of the object.

The number of pixels within the object region, or the proportion which the object region occupies within the image, is used as the size information of the object.

Then, for each object extracted from the inputted image, the degree of similarity computing section 18 computes, on the basis of both characteristic information, the degrees of similarity with all of the objects which are registered in the partial image database corresponding to that object name.

Figure 3:
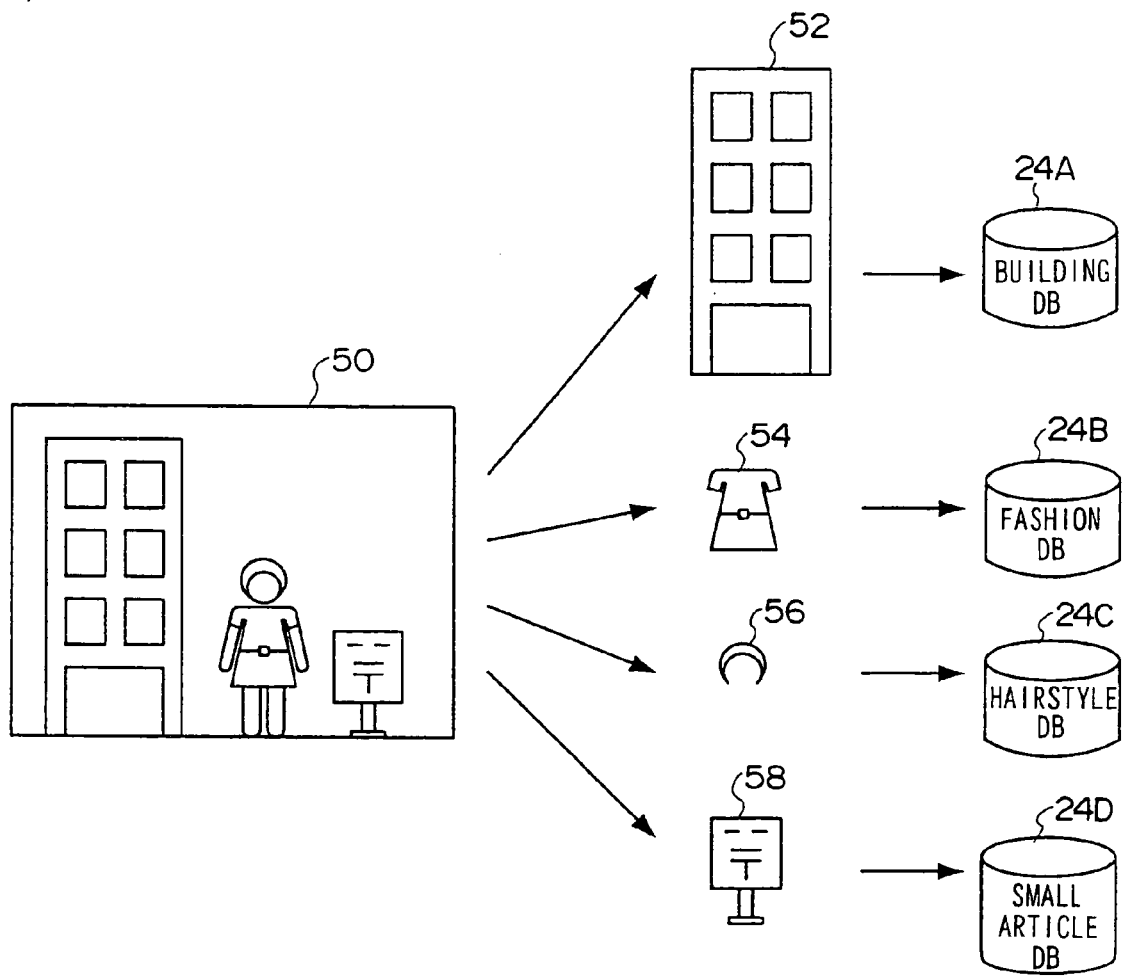
FIG. 3 is an image diagram for explaining extraction of objects.

For example, if the inputted image is an image 50 as shown in FIG. 3 which includes objects such as a building, a person, a small article (the mailbox in FIG. 3), and the like, a building object 52, a fashion (i.e., clothes) object 54, a hairstyle object 56, and a small article object 58 are extracted from the image 50 and the types thereof are identified, by the aforementioned partial image identifying section 14.

Then, for the extracted building object 52, the degrees of similarity with all of the objects registered in the building database 24A are computed. For the extracted fashion object 54, the degrees of similarity with all of the objects registered in the fashion database 24B are computed. For the extracted hairstyle object 56, the degrees of similarity with all of the objects registered in the hairstyle database 24C are computed. For the extracted small article object 58, the degrees of similarity with all of the objects registered in the small article database 24D are computed.

Note that an evaluation value, which is computed by an evaluation value computing method which computes a preset evaluation value on the basis of both characteristic information, is used as the degree of similarity. The higher the evaluation value, the higher the degree of similarity is judged to be.

The photographing time period specifying section 20 specifies the photographing time period from the respective degrees of similarity computed by the degree of similarity computing section 18. For example, the photographing time period of an object, which is registered in the partial image database, and which has the highest degree of similarity with an extracted object among the degrees of similarity with the respective objects registered in the respective partial image databases which degrees of similarity are computed for the extracted objects, and whose degree of similarity is greater than or equal to a predetermined threshold value, is specified as the photographing time period of the inputted image. Note that, if all of the degrees of similarity computed for the respective objects are less than the predetermined threshold value, the photographing time period is considered to be unclear.

In this way, in the present embodiment, objects are extracted from an inputted image, the type of each object is specified, and then a similar partial image is searched for from partial images registered in a partial image database for the type of object, and the photographing time period is specified. Therefore, a similar partial image can be retrieved and the photographing time period can be specified efficiently. Further, if there exists, in the partial image database, an object having a high degree of similarity with one object among the objects included in the inputted image, the photographing time period can be specified. Therefore, arriving at a judgment that the photographing time period is unclear can be prevented as much as possible.

The registering section 22 registers the extracted objects in the partial image databases of the corresponding types, in association with their specified photographing time periods. Namely, in the case in which the inputted image is the image 50 shown in FIG. 3, the building object 52 is registered in the building database 24A, the fashion object 54 is registered in the fashion database 24B, the hairstyle object 56 is registered in the hairstyle database 24C, and the small article object 58 is registered in the small article database 24D.

In this way, each time an image is inputted, the extracted objects are registered in the respective partial image databases.

The outputting section 26 outputs the specified photographing time period. The outputting section 26 may be, for example, a display for displaying the specified photographing time period, a printer for printing the specified photographing time period out onto a sheet, a recording device for recording the specified photographing time period onto a recording medium, or the like.

Figure 4:
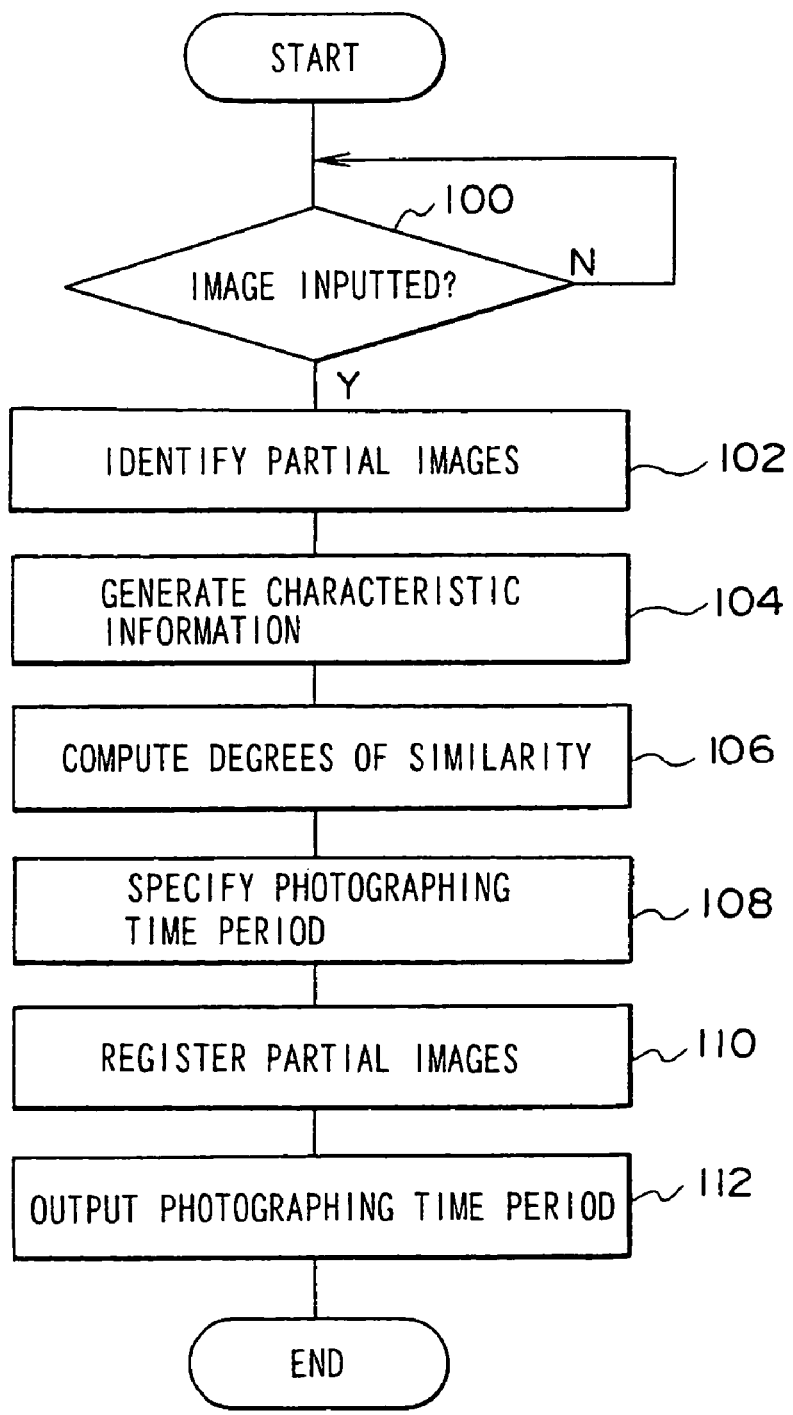
FIG. 4 is a flowchart of a control routine executed at the image processing device.

Next, the processing routine executed at the image processing device 10 will be described as the operation of the present embodiment, with reference to the flowchart of FIG. 4.

First, in step 100, it is judged whether or not an image has been inputted by the image inputting section 12. If an image has not been inputted, the routine stands by until an image is inputted. Then, when an image is inputted by the image inputting section 12, the routine moves on to step 102.

In step 102, the partial image identifying section 14 divides the inputted image into regions for each of the objects included in the inputted image, extracts the object regions, and identifies the types of the extracted objects.

In subsequent step 104, the characteristic information generating section 16 computes a characteristic amount for each of the identified objects, and generates characteristic information for each object on the basis of the characteristic amount.

In step 106, for each of the identified objects, the degree of similarity computing section 18 computes, on the basis of the both characteristic information, the degrees of similarity with all of the objects registered in the partial image database 24 of the type corresponding to the identified object. At this time, before computing the degrees of similarity, the characteristic information generating section 16 generates in advance characteristic information of the objects registered in the partial image database 24. Note that the characteristic information may be registered in advance in the partial image database. In this way, there is no need to, each time that the degrees of similarity are computed, generate characteristic information of the objects registered in the partial image database, and processing can be carried out efficiently.

In step 108, on the basis of the respective degrees of similarity computed in step 106, the photographing time period specifying section 20 specifies the photographing time period. Namely, the photographing time period of an object, which is registered in the partial image database, and which has the highest degree of similarity with an extracted object among the degrees of similarity with the respective objects registered in the respective partial image databases which degrees of similarity are computed for the extracted objects, and whose degree of similarity is greater than or equal to a predetermined threshold value, is specified as the photographing time period of the inputted image. Further, if all of the degrees of similarity computed for the respective objects are less than the predetermined threshold value, the photographing time period is considered to be unclear.

In step 110, the registering section 22 registers the extracted objects in the partial image databases of the types corresponding thereto, in association with the specified photographing time period. Then, in step 112, the specified photographing time period is outputted by the outputting section 26.

In this way, in the present embodiment, objects are extracted from an inputted image, the type of each object is specified, and then a similar partial image is searched for from partial images registered in a partial image database of that type of object, and the photographing time period is specified. In this way, a partial image which is similar to an inputted image can be retrieved efficiently, and the photographing time period of an inputted image, whose photographing time period is unclear, can be specified accurately.

What is claimed is:

1. An image processing device comprising:
 a partial image extracting section extracting a partial image from an inputted image;
 a type distinguishing section distinguishing a type of the partial image;
 a plurality of partial image databases provided respectively for each of the types, and storing registered partial images and photographing time periods of the registered partial images in association with one another;
 a characteristic information generating section generating characteristic information of the partial image and characteristic information of the registered partial images;

a degree of similarity computing section computing, on the basis of both characteristic information, degrees of similarity between the partial image and the registered partial images which are stored in the partial image database which corresponds to the type of the partial image;

a photographing time period specifying section specifying a photographing time period of the inputted image, on the basis of results of computation by the degree of similarity computing section; and an outputting section outputting the photographing time period which is specified.

2. The image processing device of claim 1, wherein the photographing time period specifying section specifies, as the photographing time period of the inputted image, a photographing time period of a registered partial image whose degree of similarity is greater than or equal to a predetermined threshold value and whose degree of similarity is highest, among the degrees of similarity computed by the degree of similarity computing section.

3. The image processing device of claim 2, further comprising a registering section which registers, in the corresponding partial image database, the partial image together with information regarding the photographing time period specified by the photographing time period specifying section.

4. The image processing device of claim 1, further comprising a registering section which registers, in the corresponding partial image database, the partial image together with information regarding the photographing time period specified by the photographing time period specifying section.

5. The image processing device of claim 1, wherein the partial image database is structured from a plurality of partial image databases for each type of object structuring the inputted image.

6. The image processing device of claim 5, wherein, in each of the plurality of partial image databases, partial image data of objects photographed in advance at various time periods is stored in association with added information such as photographing time period information thereof.

7. The image processing device of claim 6, wherein the photographing time period includes year, month, and date.

8. The image processing device of claim 5, wherein one partial image database of the plurality of partial image databases is a building database, and at least one partial image data among buildings, various types of monuments, landmarks, and other manmade landscape features, is stored in the building database.

9. The image processing device of claim 5, wherein one partial image database of the plurality of partial image databases is a fashion database, and a partial image database of clothes which were common in or which were in vogue in each era is stored in the fashion database.

10. The image processing device of claim 5, wherein one partial image database of the plurality of partial image databases is a hairstyle database, and a partial image database of hairstyles which were common in or which were in vogue in each era is stored in the hairstyle database.

11. The image processing device of claim 5, wherein one partial image database of the plurality of partial image databases is a small article database, and at least one partial image data among mailboxes and public telephones of each era, and pop-culture goods or brand-name goods which were popular at those times, is stored in the small article database.

12. The image processing device of claim 1, wherein the degree of similarity computing step computes on the basis of the generated characteristic information.

13. The image processing device of claim 1, where in the extracted partial image is not part of any of the plurality of partial image databases.

14. The image processing device of claim 1, where in the registered partial images are stored in the respective partial image databases before the inputted image is input.

15. An image processing method comprising the steps of:

judging whether or not an image has been inputted by an image inputting section;

if an image has been inputted, dividing the inputted image into regions for each object included in the inputted image, and extracting object regions, and identifying types of extracted objects;

computing a characteristic amount for each identified object, and on the basis of the characteristic amount, generating characteristic information of each object;

for each identified object, computing, on the basis of both characteristic information, degrees of similarity with all objects which are registered in a partial image database of a type corresponding to the object;

specifying a photographing time period on the basis of the respective degrees of similarity;

registering the extracted objects in association with the specified photographing time period, in the partial image databases of the types corresponding to the objects; and outputting the specified photographing time period.

16. The image processing method of claim 15, wherein the degree of similarity computing section computes on the basis of characteristic information generated by the characteristic information generating section.

17. The image processing method of claim 15, wherein, in each of the partial image databases, partial image data of objects photographed in advance at various time periods is stored in association with added information comprising as photographing time period information thereof.

18. The image processing method of claim 15, wherein one partial image database is a building database, and at least one partial image data among buildings, various types of monuments, landmarks, and other manmade landscape features, is stored in the building database.

19. The image processing method of claim 15, wherein one partial image database is a fashion database, and a partial image database of clothes which were common in or which were in vogue in each era is stored in the fashion database.

20. The image processing method of claim 15, wherein one partial image database is a hairstyle database, and a partial image database of hairstyles which were common in or which were in vogue in each era is stored in the hairstyle database.

21. The image processing method of claim 15, wherein one partial image database is a small article database, and at least one partial image data among mailboxes and public telephones of each era, and pop-culture goods or brand-name goods which were popular at those times, is stored in the small article database.

22. The image processing method of claim 15, wherein the registered objects are registered in the respective partial image databases before the inputted image is input.

* * * * *